(12) United States Patent
Ferrari et al.

(10) Patent No.: US 12,170,546 B2
(45) Date of Patent: Dec. 17, 2024

(54) SIMULATION OF WI-FI SIGNAL PROPAGATION IN THREE-DIMENSIONAL VISUALIZATION

(71) Applicant: Cisco Technology, Inc., San Jose, CA (US)

(72) Inventors: Stefano Ferrari, le mont sur Lausanne (CH); Salvatore Valenza, Pomy (CH); Samer Salam, Beirut (LB); Taha Hajar, Chavannes-Renens (CH); Nikodin Ristanovic, Lausanne (CH); Arun G. Khanna, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/354,478

(22) Filed: Jul. 18, 2023

(65) Prior Publication Data
US 2023/0361891 A1    Nov. 9, 2023

Related U.S. Application Data

(63) Continuation of application No. 17/481,767, filed on Sep. 22, 2021, now Pat. No. 11,742,965.
(Continued)

(51) Int. Cl.
*H04B 17/318*     (2015.01)
*G01S 13/89*      (2006.01)
*H04B 17/391*     (2015.01)

(52) U.S. Cl.
CPC ............ *H04B 17/318* (2015.01); *G01S 13/89* (2013.01); *H04B 17/391* (2015.01)

(58) Field of Classification Search
CPC ..... H04B 17/318; H04B 17/391; G01S 13/89; H04W 16/18; H04L 41/0816
See application file for complete search history.

(56) References Cited

U.S. PATENT DOCUMENTS 10,117,065 B1   10/2018   De Lorenzo et al.
2009/0278849 A1*  11/2009  Williams .............. G06T 11/206
                                                       345/441
(Continued)

FOREIGN PATENT DOCUMENTS

CN    104284418 A     1/2015
KR    20210080369 A    6/2021
WO    2020007483 A1    1/2020

OTHER PUBLICATIONS

Vasiliadis et al., "An efficient representation of combined indoor/outdoor 3D mobile radio-coverage"; IEEE Xplore: Nov. 8, 2004, Published in: Twelfth Intrenational Conference on Antennas adn propagation, 2003 (ICAP 2003). (Conf. Publ. No. 491)/ Print ISBN: 0-85296-752-7, 2003.*

*Primary Examiner* — Fred A Casca
(74) *Attorney, Agent, or Firm* — Polsinelli P.C.

(57) ABSTRACT

The present disclosure is directed to 3-D visualization of wireless signal propagation representing wireless signal strength and interference in 3-D space. The present technology can identify a plurality of access points (APs) in the 3-D space, determine a wireless signal strength for each of the plurality of APs, and determine an interference with the wireless signal strength of each of the plurality of APs, wherein the interference is caused by a neighboring AP of the plurality of APs in the 3-D space. The present technology can further present a 3-D visualization of a wireless signal propagation pattern representing the wireless signal strength from each of the plurality of APs in the 3-D space and the interference from the neighboring AP.

20 Claims, 11 Drawing Sheets

Related U.S. Application Data

(60) Provisional application No. 63/224,340, filed on Jul. 21, 2021.

(56) References Cited

U.S. PATENT DOCUMENTS

| | | |
|---|---|---|
| 2018/0083848 A1 | 3/2018 | Siddiqi et al. |
| 2019/0296789 A1 | 9/2019 | Yu et al. |
| 2020/0395996 A1 | 12/2020 | Nakayama |
| 2022/0268862 A1 | 8/2022 | Yoshikawa et al. |

\* cited by examiner

SIMULATION OF WI-FI SIGNAL PROPAGATION IN THREE-DIMENSIONAL VISUALIZATION

CROSS-REFERENCE TO RELATED APPLICATIONS

This application is a Continuation of U.S. patent application Ser. No. 17/481,767, filed Sep. 22, 2021, which in turn claims priority to U.S. provisional application No. 63/224,340 filed on Jul. 21, 2021, the entire contents of which are expressly incorporated by reference herein by reference in their entirety.

TECHNICAL FIELD

The subject matter of this disclosure relates in general to the field of wireless networks, and more particularly, to systems and methods for providing a three-dimensional (3-D) visualization of a wireless signal propagation including wireless signal strength of each of a plurality of access points (APs) and interference from neighboring APs.

BACKGROUND

With growing interest in optimizing the wireless network infrastructure to improve the wireless network performance, various wireless network planning tools are available for analyzing, visualizing, and troubleshooting the wireless signal propagation (e.g., Wi-Fi coverage) of the wireless network.

A visualization of the wireless signal propagation can help understanding the signal propagation (i.e., assessing the signal propagation behavior) and validating the signal propagation based on signal level measurements from APs and sensors so that an optimized wireless network can be designed as to where to place or how to configure Wi-Fi APs. Also, the visualization of the wireless signal propagation can help with site survey measurements and capture accurate visual representations for network design.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1:
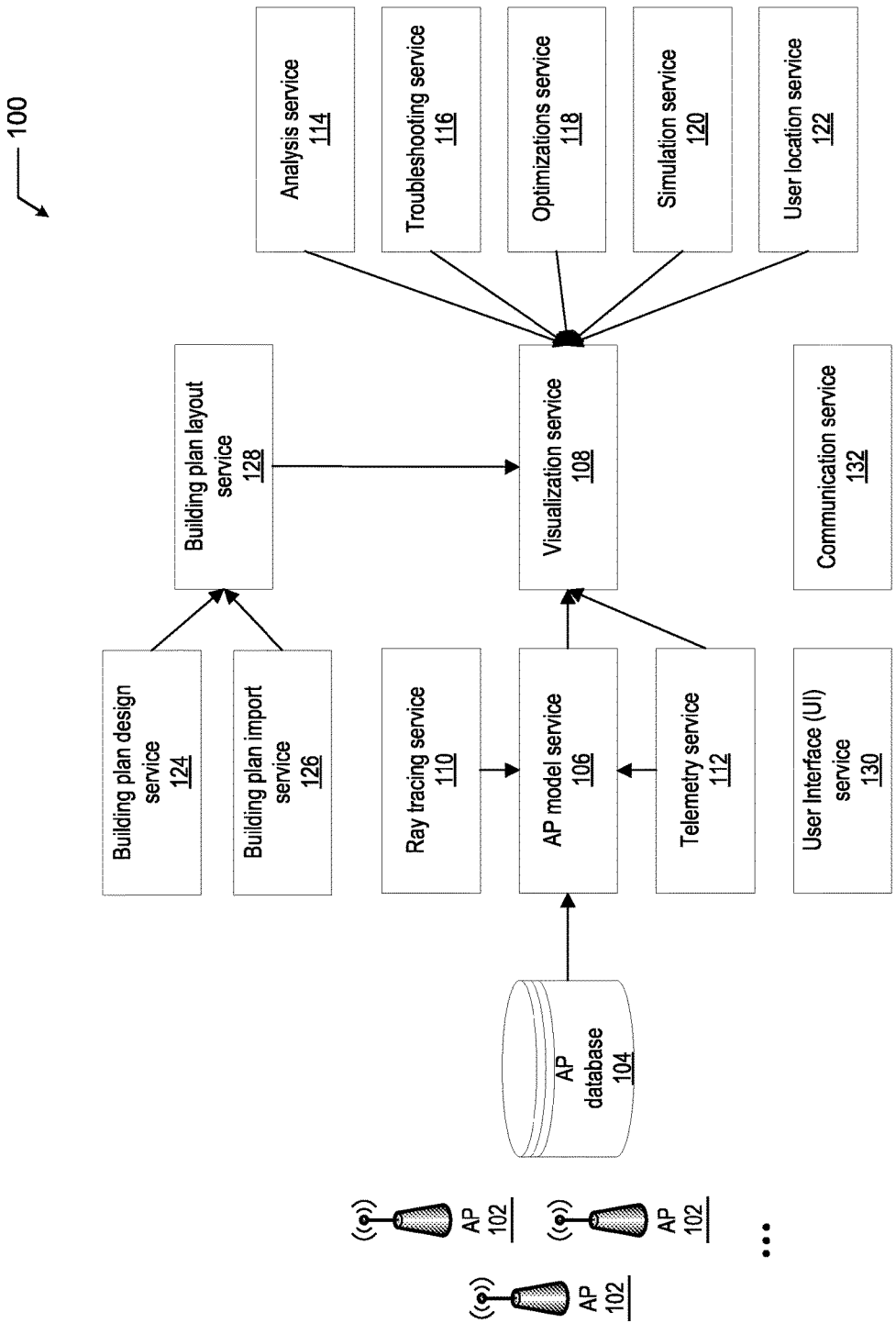
FIG. 1 illustrates an example visualization system for presenting a wireless signal propagation in 3-D according to some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Various wireless network planning tools are available for analyzing, simulating, visualizing, and troubleshooting the wireless signal propagation of the wireless network. Many such tools rely on technicians to walk around on-site and place marking on the map to take measurements throughout the floor after deployment of a network. However, such tools not only require the physical presence of the technicians on-site for manually taking measurements, but also provide site surveys that do not accurately reflect the wireless signal propagation, which may result in a less accurate 3-D visualization.

Therefore, there exists a need for 3-D visualization of Wi-Fi signal propagation that accurately represents the wireless signal strength of APs and interferences between APs. The present technology includes systems, methods, and computer-readable media for solving these problems and discrepancies. Specifically, systems, methods, and computer-readable media for providing a 3-D visualization of a Wi-Fi signal propagation including wireless signal strength of APs and interference from neighboring APs are provided in the present disclosure.

Overview

The present technology includes systems, methods, and computer-readable media are provided for providing stimulation of W-Fi signal propagation in a 3-D visualization including wireless signal strength and interferences.

According to at least one example of the present technology, a method includes identifying a plurality of APs in a 3-D space, determining a wireless signal strength for each of the plurality of APs, and determining an interference with the wireless signal strength of each of the plurality of APs where the interference is caused by a neighboring AP of the plurality of APs in the 3-D space. The method further includes presenting a 3-D visualization of a wireless signal propagation pattern representing the wireless signal strength from each of the plurality of APs in the 3-D space and the interference from the neighboring AP. The wireless signal propagation pattern includes partitioning of the 3-D space into one or more segments based on a degree of the wireless signal strength and the interference from the neighboring AP.

In another example, a system for providing a 3-D visualization of a Wi-Fi signal propagation pattern including wireless signal strength and interference (e.g., 3-D signal propagation visualization system) is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the one or more processors (e.g., a visualization service) to identify a plurality of APs in a 3-D space, determine a wireless signal strength for each of the plurality of APs, determine an interference with the wireless signal strength of each of the plurality of APs where the interference is caused by a neighboring AP of the plurality of APs in the 3-D space, and present a 3-D visualization of a wireless signal propagation pattern representing the wireless signal strength from each of the plurality of APs in the 3-D space and the interference from the neighboring AP.

A non-transitory computer-readable storage medium having stored therein instructions which, when executed by one or more processors (e.g., a visualization service), can cause the one or more processors to identify a plurality of APs in a 3-D space, determine a wireless signal strength for each of the plurality of APs, determine an interference with the wireless signal strength of each of the plurality of APs where the interference is caused by a neighboring AP of the plurality of APs in the 3-D space, and present a 3-D visualization of a wireless signal propagation pattern representing the wireless signal strength from each of the plurality of APs in the 3-D space and the interference from the neighboring AP.

DESCRIPTION

FIG. 1 illustrates an example 3-D signal propagation visualization system 100 for presenting a wireless signal propagation in 3-D according to some aspects of the disclosed technology. As shown in FIG. 1, the 3-D signal propagation visualization system 100 can include one or more services primarily responsible for examining and analyzing signals from a plurality of access points (APs) 102A, 102B, 102C, . . . (collectively, 102), determining a signal propagation pattern for the APs 102 based on a signal propagation model, and providing a 3-D visualization of the signal propagation pattern including analysis, troubleshooting, simulations, or optimizations of the signal propagation pattern.

The 3-D signal propagation visualization system 100 can include an AP database 104 that includes information about the plurality of APs 102, which are configured to transmit wireless communication signals. In some aspects, the information about the plurality of APs 102 can include, but is not limited to a location of APs 102 and their orientation (e.g., azimuth and elevation angles), a model number, a signal strength, end-of-life data, an antenna type, a channel, a frequency (band), or network information of which the APs 102 belong.

The 3-D signal propagation visualization system 100 can include an AP model service 106 that is a collection of signal propagation models for different types of AP antennae 102. In some examples, the signal propagation model includes a description of the signal propagation pattern based on the information associated with the AP antennae 102. For example, such information can be provided by the AP database 104 or related to parameters derived from various configuration attributes and measurements such as transmission power (txPower), signal-to-noise ratio (SNR), Key Performance Indicator (KPI) values, or Received Signal Strength Indication (RSSI) values.

The 3-D signal propagation visualization system 100 can include a visualization service 108 configured to perform 3-D modeling, i.e., display a 3-D visualization of the signal propagation pattern based on the signal propagation model, the antenna pattern of the Wi-Fi AP, the configuration of the Wi-Fi AP (txPower, azimuth angle, elevation, band and channel) and the geometry of a space as defined in a building plan. In some examples, the visualization service 108 can display the 3-D visualization of the signal propagation in the form of a heatmap, which uses color-coding to represent different values of the signal strength. In some instances, the visualization service 108 can generate a time-based (temporal) visualization where changes in the signal propagation pattern over time can be presented in the 3-D visualization.

The 3-D signal propagation visualization system 100 can also include a ray tracing service 110 configured to perform ray tracing from a particular AP. In some examples, the ray-tracing service 110 can compute attenuation based on the line-of-sight from a particular AP to a certain vertex in space. For example, ray tracing can be used to visualize the signal propagation by tracing paths of electromagnetic waves and simulating the way that the waves interact with any objects it may hit. If a straight line is drawn from a particular AP and does not hit anything in the space, then the signal propagation model works in a straightforward manner. On the other hand, if there is an obstacle (e.g., a wall, shelving, ceiling, etc.) along the path, the signal propagation pattern can be broken into multiple segments since the signal propagation pattern can change depending on the properties of the obstacle that the pattern has to pass through.

The 3-D signal propagation visualization system 100 can include a telemetry service 112 configured to collect and record data from the plurality of APs 102 or sensors on the floor pertaining to the APs 102 in space. In some examples, the telemetry data can be used to update information about a particular AP (e.g., model, antenna type, etc.) or feed into the visualization service 108 to provide an optimized 3-D visualization instead of relying on a predicted model. In some instances, the telemetry service 112 can utilize the telemetry data to validate a certain predicted model.

The 3-D signal propagation visualization system 100 can also include an analysis service 114 that is configured to analyze data associated with the wireless coverage such as SNR measurements, latency measurements, a number of client devices associated with each of the APs, KPI values, txPower measurements, or RSSI measurements. In some instances, the analysis service 114 can further perform analysis pertaining to data associated with one or more errors or constraints of the APs 102 that can impact the wireless coverage.

The 3-D signal propagation visualization system 100 can include a troubleshooting service 116 configured to perform various types of troubleshooting by isolating and root-causing issues or errors relating to the network performance and signal propagation pattern based on the APs 102 and providing suggestions to resolve such issues or errors. In some examples, the troubleshooting service 116 can identify both cause and consequences of the issues, for example, obstructions in the line of sight, a level of signal coverage, a number of client devices connected to APs, co-channel interference, or stickiness of roaming clients to APs.

The 3-D signal propagation visualization system 100 can include an optimization service 118 configured to provide a 3-D visualization of the optimized signal propagation pattern that provides better operational signal coverage and lower interference. In some examples, the optimization service 118 can provide an upgrade option for the APs or configuration settings to achieve improved network performance. In some instances, the optimization service 118 can provide the optimized 3-D visualization that illustrates dynamic changes as conditions in the network change. In some examples, the optimization service 118 can propose different optimized layouts by radio spectrum (RF) or deployment of the APs for a given space.

The 3-D signal propagation visualization system 100 can also include a simulation service 120 configured to simulate various scenarios relating to deployment of APs, potential network failures, estimated RF leakage, or alternative network configurations. In some instances, the simulation service 120 can provide a simulated 3-D visualization of the various proposed layouts provided by the optimization service 118.

In some examples, the simulation service 120 can provide a simulated 3-D visualization illustrating the impact of an alternative deployment of APs, for example, how the signal propagation pattern is impacted by deploying a new or upgraded AP at different locations on the floor. Also, the simulation service 120 can simulate a 3-D visualization based on the impact of an upgrade or different AP upgrade strategies prior to the actual update to observe and compare the wireless coverage.

Furthermore, a type of materials of obstructions in the space can significantly impact the signal propagation pattern. The simulation service 120 can provide a simulated visualization of the signal propagation pattern depending on the type of materials of obstacles such as walls or shelving, or what is stored on shelving (e.g., liquid, metal, non-metal, etc.).

Additionally, the simulation service 120 can provide a simulated 3-D visualization illustrating potential network failures. For example, the simulation service 120 can help define coverage zones to avoid coverage blackout zones in common.

The 3-D signal propagation visualization system 100 can also include a user location service 122 configured to identify a location of a user (e.g., client device) and obtain data associated with the user/client device to determine the signal propagation pattern. For example, a client density can significantly affect the wireless network coverage.

In some examples, the user location identified by the user location service 122 can be combined with an AP coverage so that the 3-D visualization can include the impact of the client device such as an operating system of client devices, client device density, or any RF interference due to the presence of RF-emitting device (e.g., mobile phones, cordless phones, wireless security cameras, etc.).

In some examples, the user location service 122 can help to optimize the latency and the signal propagation pattern by identifying the location of client devices and the type of services that the client devices are performing. For example, too many client devices performing VoIP calls on the same AP can worsen the network performance and cause a bad call quality due to latencies. The 3-D visualization of the signal propagation pattern can include the user location provided by the user location service 122 to illustrate such impact of the client devices on the wireless network coverage.

The 3-D signal propagation visualization system 100 can also include a building plan design service 124 configured to allow a user to manage the settings of the building plan or the floor plan of the space (e.g., layout, objects, viewpoint, etc.).

The 3-D signal propagation visualization system 100 can include a building plan import service 126 configured to import a building plan or a floor plan. The building plan or the floor plan can be in any suitable format, for example, a Building Information Modeling (BIM) file or a Computer-Aided Design (CAD) file. In some examples, the building plan import service 126 can import the building plan or the floor plan that contains a technical drawing, blueprint, schematic, or 3-D rendering of the floor that is to be visualized in 3-D.

In some instances, the signal propagation pattern can be overlaid over the building plan or the floor plan provided by the building plan import service 126. Depending on the type of the imported file for the building plan, details of the building or the floor such as a type of materials of the obstacles (e.g., a wall, etc.) or location of APs or sensors can further be included in the building plan.

The 3-D signal propagation visualization system 100 can also include a building plan layout service 128 configured to store the building plan layout and support the 3-D visualization of the building plan layout. In some examples, the building plan layout service 128 can perform the function of a management and control platform for managing, monitoring, and storing data associated with the visualization based on the building plan.

The 3-D signal propagation visualization system 100 can also include a user interface service 130 configured to allow a user to manage and control settings of the visualization or network configurations to optimize the 3-D visualization. For example, the settings can include a viewpoint (e.g., a first-person perspective, an orbit view, or a bird's eye view), layout, parameters (e.g., txPower, SNR measurements, KPI values, RSSI values, etc.), or visualization options. Also, the examples of network configurations can include but are not limited to elevation or azimuth angle of APs, deployment of APs, band and a type of network or APs.

In some instances, the user interface service 130 can provide information to or receive feedback from the user via a communication service 132 as further described below. In some examples, the user may be asked to evaluate and manage various suggestions proposed by the troubleshooting service 116 or the optimization service 118.

The 3-D signal propagation visualization system 100 can also include a communication service 132 configured to transmit and receive information wirelessly over a network. In some examples, the communication service 132 can send and receive communications from/to a building plan system (not shown) that may provide building plan updates. In some instances, the communication service 132 can transmit and receive data from/to a user for analyzing, troubleshooting, simulating, or optimizing the 3-D visualization of the signal propagation pattern.

Figure 2:
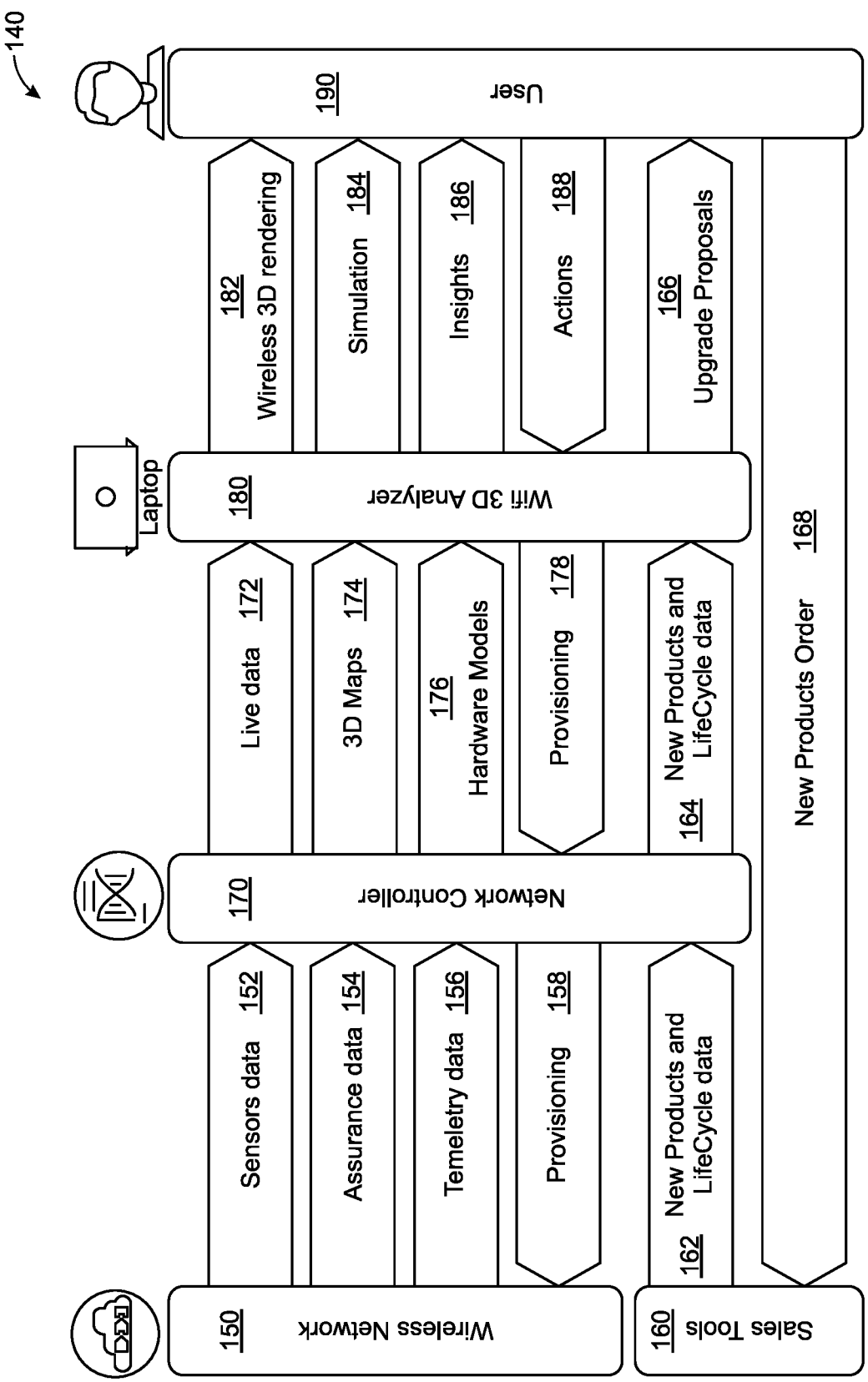
FIG. 2 illustrates an example network architecture of a visualization system for presenting a wireless signal propagation in 3-D according to some aspects of the disclosed technology.

FIG. 2 illustrates an example network architecture 140 for the 3-D signal propagation visualization system 100 illustrated in FIG. 1 according to some aspects of the disclosed technology. The network architecture 140 comprises a wireless network 150, sales tools 160, a network controller 170, a Wi-Fi 3D analyzer 180, and a user 190. In some embodiments, Wi-Fi 3D analyzer 180 executes on a client device and takes advantage of hardware acceleration capabilities from a graphics processor, but Wi-Fi 3D analyzer 180 can operate in other environments such as on a server or on a device with only general processing capabilities, or in a cloud environment. Even though the network controller 170 and Wi-Fi 3D analyzer 180 are illustrated as separate components in FIG. 2, in some examples, they can be a single device (i.e., the Wi-Fi 3D analyzer 180 is run on the network controller 70 itself) or run in a virtualized cloud environment.

The wireless network 150 comprises APs 102 illustrated in FIG. 1, sensor(s), and user devices. The network controller 170 can include AP database 104, AP model service 106, telemetry service 112, user location service 122, building plan design service 124, building plan import service 126, and building plan layout service 128, all of which are illustrated in FIG. 1. The Wi-Fi 3D analyzer 180 can include visualization service 108, analysis service 114, troubleshooting service 116, optimizations service 118, simulation service 120, and user interface service 130, all of which are also illustrated in FIG. 1.

The wireless network 150 can transmit sensor data 152, assurance data 154, and/or telemetry data 156 to the network controller 170. The network controller 170 can store such received data and can provide user interfaces and APIs for receiving network configurations and updates. Network configurations can be used to provision 158 various devices in wireless network 150. Also, the network controller 170 can transmit live data 172, 3-D maps 174 (e.g., 3-D building plans or floor plans), and/or hardware models 176 to the Wi-Fi 3D analyzer. While not shown in FIG. 2, alternatively, live data 172, 3-D maps 174, and/or hardware models 176 can be exported to cloud instead of a local PC or GPU and provide user 190 with insights 186.

The Wi-Fi 3D analyzer 180 can use the 3-D maps 174 and hardware models 176 to generate predictions or simulations of wireless signal propagation and their correlation with the live data 172. Based on the data received from the network controller 170, the Wi-Fi 3-D analyzer 180 can provide wireless 3-D rendering 182, simulation 184, and/or insights 188 to the user 190. For example, the user can be provided with the wireless 3-D rendering 182 of the wireless signal coverage (e.g., RF coverage) and options to run simulations 184 for what-if scenarios, and insights 186 including suggestions for improving the network performance associated with the wireless signal coverage. Based on what is provided by the Wi-Fi 3D analyzer 180, the user 190 can take action 188 accordingly, for example, modifying a network configuration to improve the network performance. Wi-Fi 3D analyzer 180 can forward any updates to the network configuration for provisioning 178 to the network controller 170.

Furthermore, the sales tools 160 can provide a product upgrade management based on the communication flow between the sales tools 160, the network controller 170, and the Wi-Fi 3D analyzer 180. The sales tools 160 can transmit new products and lifecycle data 162 to the network controller 170. Then the network controller 170 forwards the new products and lifecycle data 164 to the Wi-Fi 3D analyzer 180. The new products and lifecycle data 162 and 164 can include new product availability for sale or end-of-life dates for AP products.

Based on the new products and lifecycle data 164, the Wi-Fi 3D analyzer 180 can provide upgrade proposals 166, which can include simulation 184 and insights 186 on product upgrade, to the user 190. Also, in response to the upgrade proposals, the user 190 can place a new product order 168 by utilizing the sales tools 160. For example, the new products and lifecycle data 162 can include end-of-life data associated with a particular AP so that an upgrade or replacement of a new AP can be recommended based on the end-of-life data prior to the expiry of the AP. Also, the user 190 can place an order for a new AP with the sales tools 160.

Figure 3:
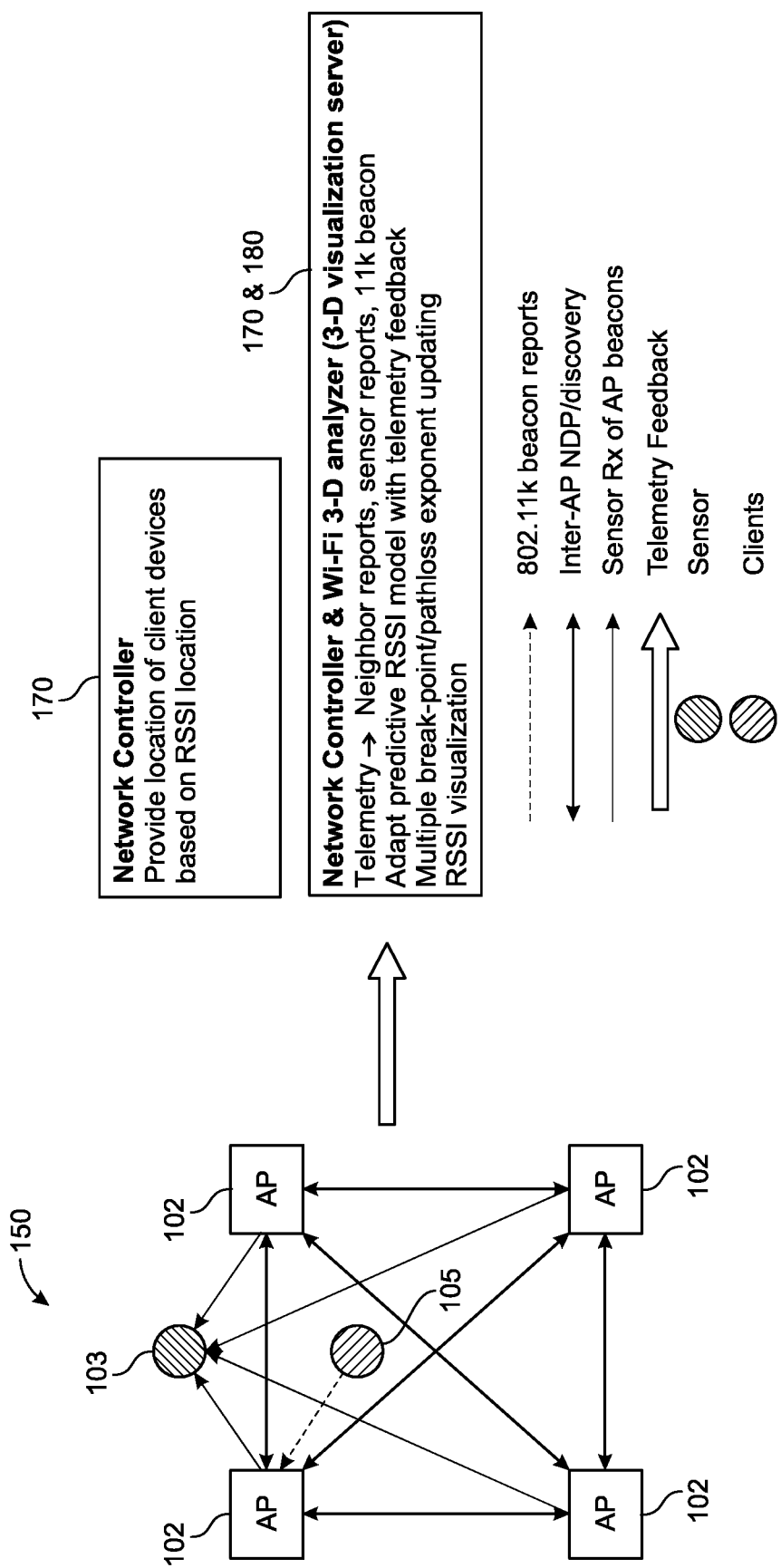
FIG. 3 illustrates an example network architecture diagram of a visualization system for presenting a wireless signal propagation in 3-D according to some aspects of the disclosed technology.

FIG. 3 illustrates an example network architecture diagram for a wireless network 150, a network controller 170, and a Wi-Fi 3-D analyzer 180 according to some aspects of the disclosed technology. The wireless network 150, also illustrated in FIG. 2, comprises APs 102 and sensors 103 and client devices 105.

The wireless network 150 can transmit telemetry feedback (for example, telemetry data 156 illustrated in FIG. 2) to the network controller 170. For example, each AP 102 transmits beacons to the sensor 103 whereby a sensor report can be generated. Also, the APs 102 communicate with each other via inter-AP Neighbor Discovery Protocol (NDP) to generate neighbor reports. Furthermore, client device 105 measures beacons and returns a report with stored beacon information (e.g., 802.11k beacon reports). Based on the neighbor reports, 802.11k beacon reports, and sensor reports, the wireless network 150 provides telemetry feedback to the network controller 170. The telemetry feedback can include information about a distance and azimuth angle between a pair of APs or an AP and a sensor and walls or any obstructions between the pair on a building plan or a floor plan. Also, network controller 170 includes location information of client devices based on RSSI location, which is received from the wireless network 150.

Based on the data provided by the wireless network 150, the network controller 170 and the Wi-Fi 3-D analyzer 180 can determine a predictive RSSI model and visualize the predicted RSSI at all 3-D locations.

Figure 4:
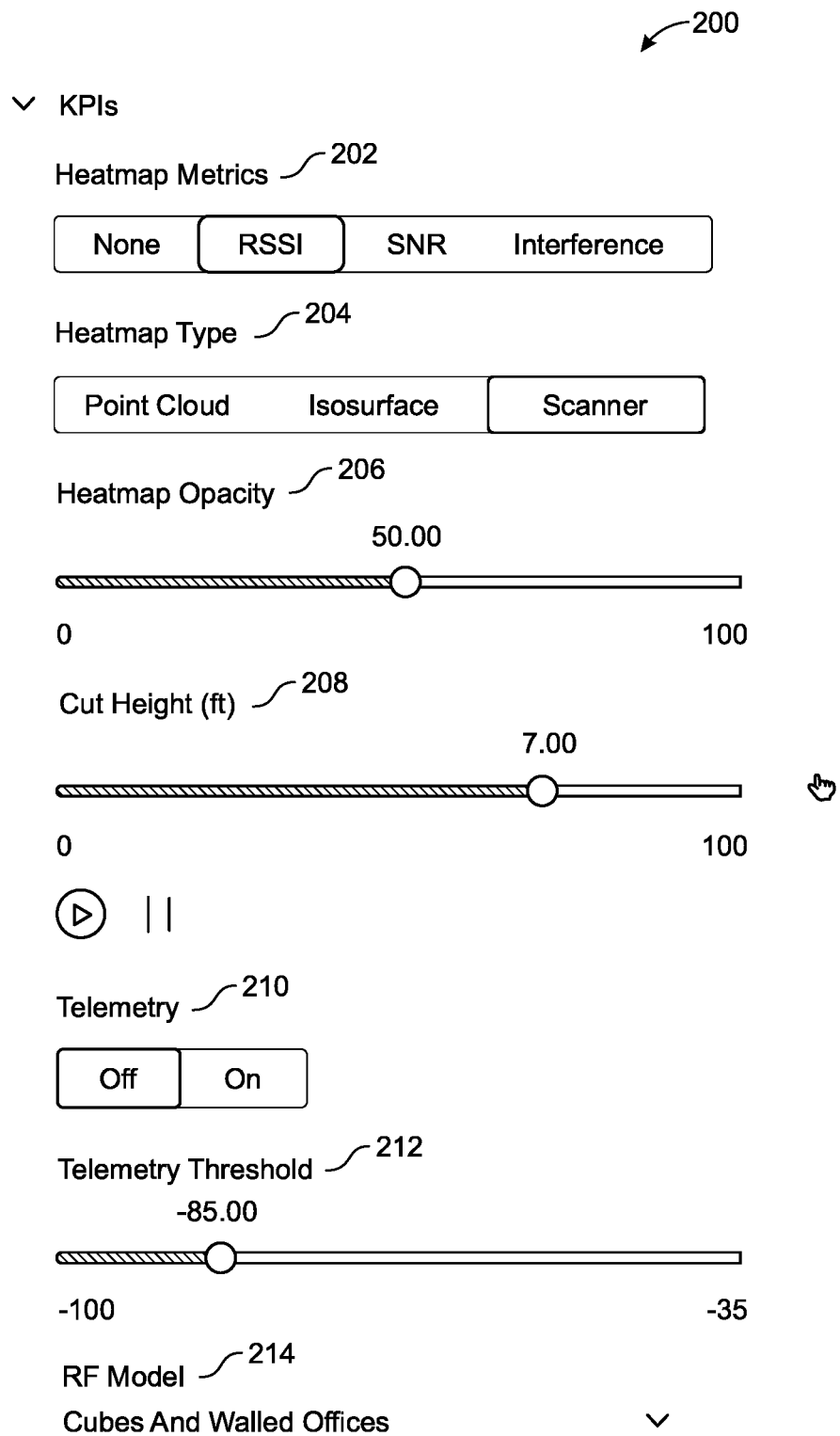
FIG. 4 illustrates an example control menu for a 3-D visualization system according to some aspects of the disclosed technology.

FIG. 4 illustrates an example menu 200 including a list of various parameters that can be adjusted for the 3-D visualization of the wireless signal propagation.

Menu 200 provides an option for key performance indicator (KPI) heatmap metrics 202, for example, none, RSSI, SNR, or Interference. Depending on the selected heatmap metrics, the 3-D visualization of the wireless signal propagation can be presented based on RSSI values, SNR measurements, or interference measurements. RSSI values are a predicted or measured power level at a point in space of an RF transmitted from an AP. Also, SNR measurements are based on the amplitude of signal and noise level. Interference measurements or predictions are based on the power of the interfering signals.

Menu 200 also provides an option for heatmap type 204, for example, point cloud, isosurface, or scanner. A point cloud heatmap provides the 3-D visualization of the wireless signal propagation as a collection of color-coded points where a color variation corresponds to a degree of signal strength. An isosurface heatmap displays the 3-D visualization of the wireless signal propagation with isosurfaces (e.g., contour lines or surfaces) where each isosurface represents points of equal values in a 3-D space. A scanner provides the 3-D visualization of the wireless signal propagation with color-coded bands where the color of the bands corresponds to a degree of signal strength. Also, the scanner allows a user to manipulate a height in the 3-D space, for example, via a height manipulation bar under a cut height 208 so that the wireless signal propagation pattern can be scanned through the 3-D space, for example, from a ground to a ceiling and visualized at varying heights.

Furthermore, a heatmap opacity 206 can be adjusted, for example, in a scale of 0 (i.e., non-transparent) to 100 (i.e., fully transparent) to adjust the transparency of the 3-D visualization.

Also, cut height (ft) 208 can be adjusted, for example, in a scale of 0 to 10. A user can select a particular height where the 3-D visualization is desired. Or, with a play button and a pause button, the 3-D visualization of the wireless signal propagation can be simulated at continuously varying heights from 0 ft to 10 ft.

Menu 200 also provides an option where a visualization of telemetry data 210 can be switched on and off. Also, telemetry threshold 212 can be adjusted, for example, in a scale of −100 to −35.

Furthermore, menu 200 provides an option for a RF Model selection 214. For example, a drop-down list provides various options for the RF model such as cubes and walled offices, drywall offices, or open space.

While not shown in FIG. 4, menu 200 can include different or alternative options. For example, menu 200 could include an option for clipping a 3-D floor plan to take cross-sections of the floor plan to allow clear visualization of an area of interest. Menu 200 could include an adjustable noise floor to be used in calculating a signal-to-noise ratio (SNR). Menu 200 could include an option to change the model of AP being visualized to permit comparisons between various hardware options. Menu 200 could include an option to adjust the frequency band from 2.4 GHz to 5 GHz to visualize attributes associated with RF propagation at those frequencies. The 2.4 GHz band typically provides a greater distance of coverage, while the 5 GHz band typically provides faster communication speeds. Menu 200 can include antennae options that might permit visualizations using directional antennas or omnidirectional antennas. Menu 200 could provide options for adjusting transmission power of an antenna, or a channel. Menu 200 could also provide various sliders for visualizing animations such as a time scale. Accordingly, the menu can provide many options that can vary depending on the type of visualization being presented.

Figure 5:
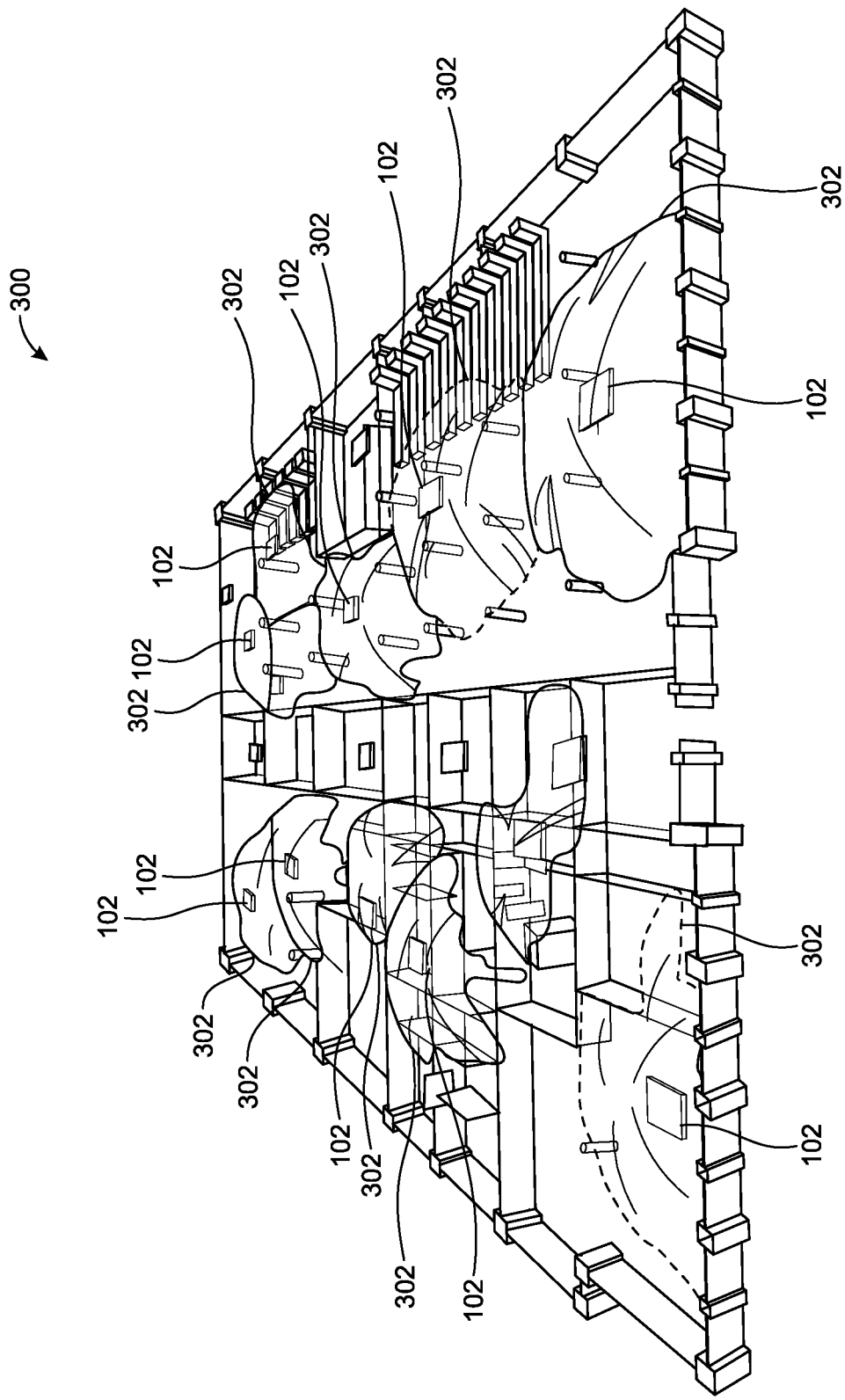
FIG. 5 illustrates an example 3-D visualization of a wireless signal propagation according to some aspects of the disclosed technology.

FIG. 5 illustrates an example 3-D visualization 300 of Wi-Fi AP RF signal propagation. In the 3-D visualization 300, the 3-D visualization of a building plan (e.g., floor plan) is overlaid with RF propagation patterns. As shown in FIG. 5, the 3-D visualization 300 illustrates the RF signal propagation patterns as a collection of zones 302 where each zone represents a service area covered by each AP 102 (e.g., AP 102 illustrated in FIG. 1). Each zone is in the shape of a dome to illustrate a signal strength in the service area in 3-D instead of a simple flat layer in 2-D. Furthermore, the color and size of the domes correspond to a degree of signal strength from the AP in the service area. The dome shape acknowledges that the RF propagation from an AP is not uniform at all heights of a floor plan.

Even though the 3-D visualization 300 of Wi-Fi AP RF signal propagation in FIG. 5 uses a color-coded dome model, the 3-D visualization of the RF signal propagation according to the present disclosure can be provided in the form of a point cloud model, a heat map, or a contour map to illustrate the degree of signal strength in the 3-D space.

Figure 6:
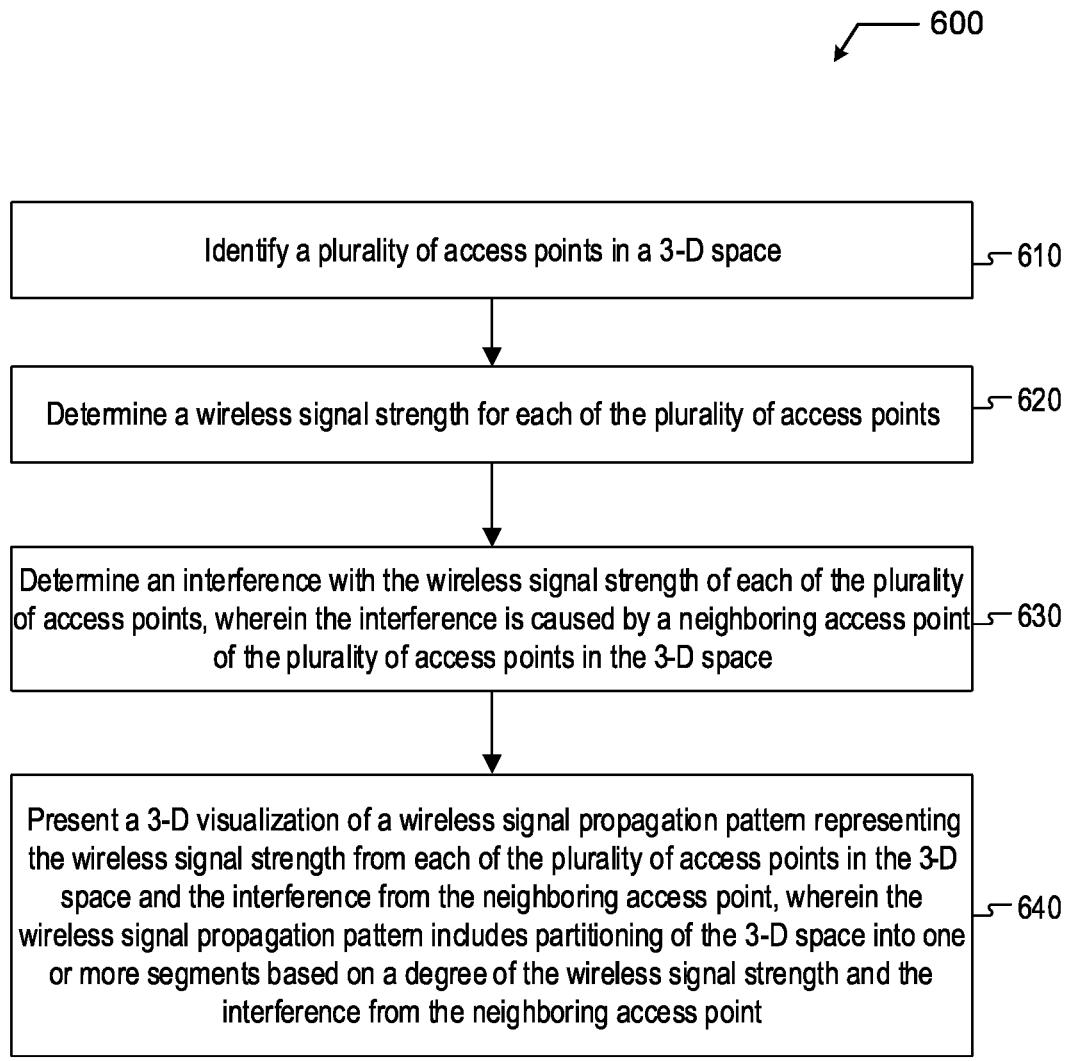
FIG. 6 is a flowchart of an example method for providing a 3-D visualization of wireless signal propagation according to an example of the instant disclosure.

FIG. 6 illustrates an example method 600 for providing a 3-D visualization of wireless signal propagation representing wireless signal strength and interference in the 3-D space. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 includes identifying a plurality of APs in 3-D space at step 610. For example, the visualization service 108 illustrated in FIG. 1 may identify a plurality of APs in a 3-D space.

According to some examples, the method 600 includes determining a wireless signal strength for each of the plurality of APs at step 620. In some instances, the wireless signal strength for each of the plurality of APs can be determined by calculating a RF propagation pattern for each of the APs. For example, the visualization service 108 illustrated in FIG. 1 may determine a wireless signal strength for each of the plurality of APs, for example, by calculating a RF propagation pattern for each of the plurality of APs.

In some examples, the visualization service 108 illustrated in FIG. 1 may calculate a RF propagation pattern for at least one Wi-Fi AP 102 based on a RF propagation model for the at least one Wi-Fi AP, the antenna pattern of the Wi-Fi AP, the configuration of the Wi-Fi AP (txPower, azimuth angle, elevation, band, and channel), and the geometry of a space as defined in a building plan.

Figure 7:
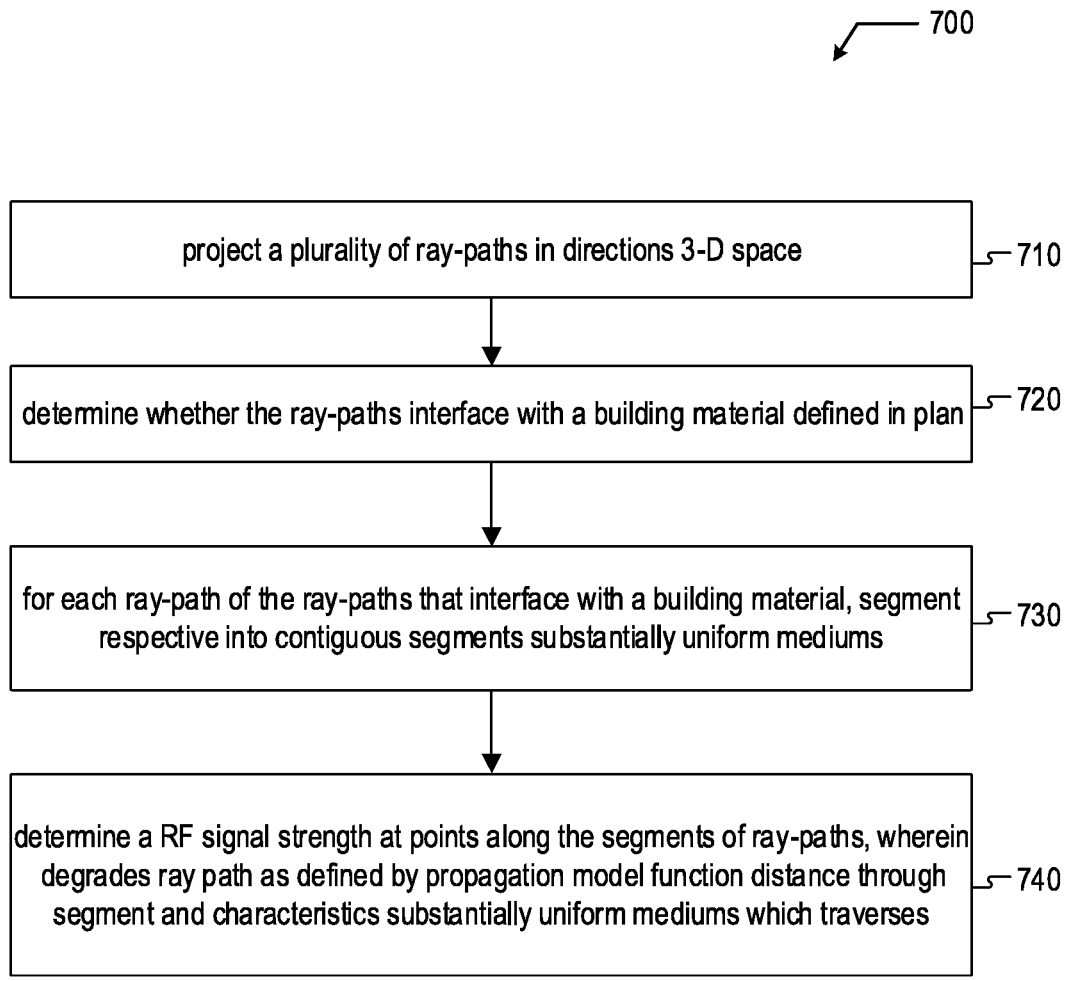
FIG. 7 is a flowchart of an example method for determining a radio frequency (RF) signal strength at points distributed in a 3-D space according to some aspects of the disclosed technology.

An example method 700 for the calculating the 3-D RF propagation pattern is illustrated in FIG. 7. The method 700 includes projecting a plurality of ray-paths in a plurality of directions in a 3-D space at block 710. For example, the ray tracing service 110 illustrated in FIG. 1 may project a plurality of ray-paths in a plurality of directions in a 3-D space. In some embodiments, the ray-paths originate from the Wi-Fi AP and emanate in a variety of X, Y, and Z planes.

The method 700 includes determining whether the ray-paths interface with a building material defined in a building plan at block 720. For example, the ray tracing service 110 illustrated in FIG. 1 may determine whether the ray-paths interface with a building material defined in a building plan.

The method 700 includes segmenting each ray-path of the ray-paths that interface with a building material the respective ray-path into contiguous segments of substantially uniform mediums at block 730. For example, the ray tracing service 110 illustrated in FIG. 1 may segment the respective ray-path into contiguous segments of substantially uniform mediums.

The ray tracing service 110 can provide the segmented ray paths to an AP model service 106. The combination of the collection of ray paths for any AP and model information from AP model service 106 can be provided to visualization service 108.

The method 700 includes determining a RF signal strength at points along the segments of the ray-paths at block 740. For example, the visualization service 108 illustrated in FIG. 1 may determine a RF signal strength at points along the segments of the ray-paths. The visualization service 108 can use the information about the collection of ray paths for any AP and a RF propagation model particular to the type of AP and the parameters for the specification AP to determine the RF signal strength at points along the segments of the ray-paths. In some embodiments, the signal degrades along the ray path as defined by the RF propagation model as a function of distance through the segment and characteristics of RF propagation pattern through the substantially uniform mediums through which the segment traverses.

In some examples, the substantially uniform mediums include open space, concrete, glass, wood, metal, non-metal, glass, liquid, or other materials. Depending on the type of materials, the ray-path interfaces in a different way, which results in varying RF signal strengths at points along the segments.

Furthermore, according to some examples, the method 600 includes determining an interference or attenuation of the wireless signal strength for each of the plurality of APs at step 630. For example, the visualization service 108 illustrated in FIG. 1 may determine an interference or attenuation of the wireless signal strength of each of the plurality of APs. In some examples, the interference or attenuation is caused by a neighboring AP of the plurality of APs in the 3-D space.

In some instances, the determining the interference or attenuation of the wireless signal strength, for example between a first AP and a second AP of the plurality of APs may include determining information associated with a band or a channel of the first and second APs, for example, whether both APs are using the same band and whether they are on the same channel or on overlapping channels, etc.

In an example of the determining the interference or attenuation of the wireless strength of each of the plurality of APs at step 630, the method 600 comprises determining a distance and an angle (e.g., azimuth angle) between a first AP and a second AP of the plurality of APs. For example, the visualization service 108 illustrated in FIG. 1 may determine a distance and an angle between a first AP and a second AP of the plurality of APs. In some examples, the first AP is a neighboring AP of the second AP in the 3-D space.

Further, the method 600 comprises determining a signal strength within an area defined by the distance and the angle between the first AP and the second AP to determine the interference or attenuation of the wireless signal strength for each of the plurality of APs caused by one or more neighboring APs. For example, the visualization service 108 illustrated in FIG. 1 may determine a signal strength within an area defined by the distance and the angle between the first AP and the second AP to determine the interference or attenuation of the wireless signal strength of each of the plurality of APs caused by one or more neighboring APs.

In some instances, the distance and azimuth angle between APs or a pair of an AP and a sensor can further provide telemetry information, which can be used to update a path loss model for 3-D visualization of the wireless signal propagation. In some examples, the path loss model can be used to compute the decrease in the power of a wireless signal (i.e., wireless signal strength) or to compute attenuation along a line-of-sight propagation path.

Figure 8:
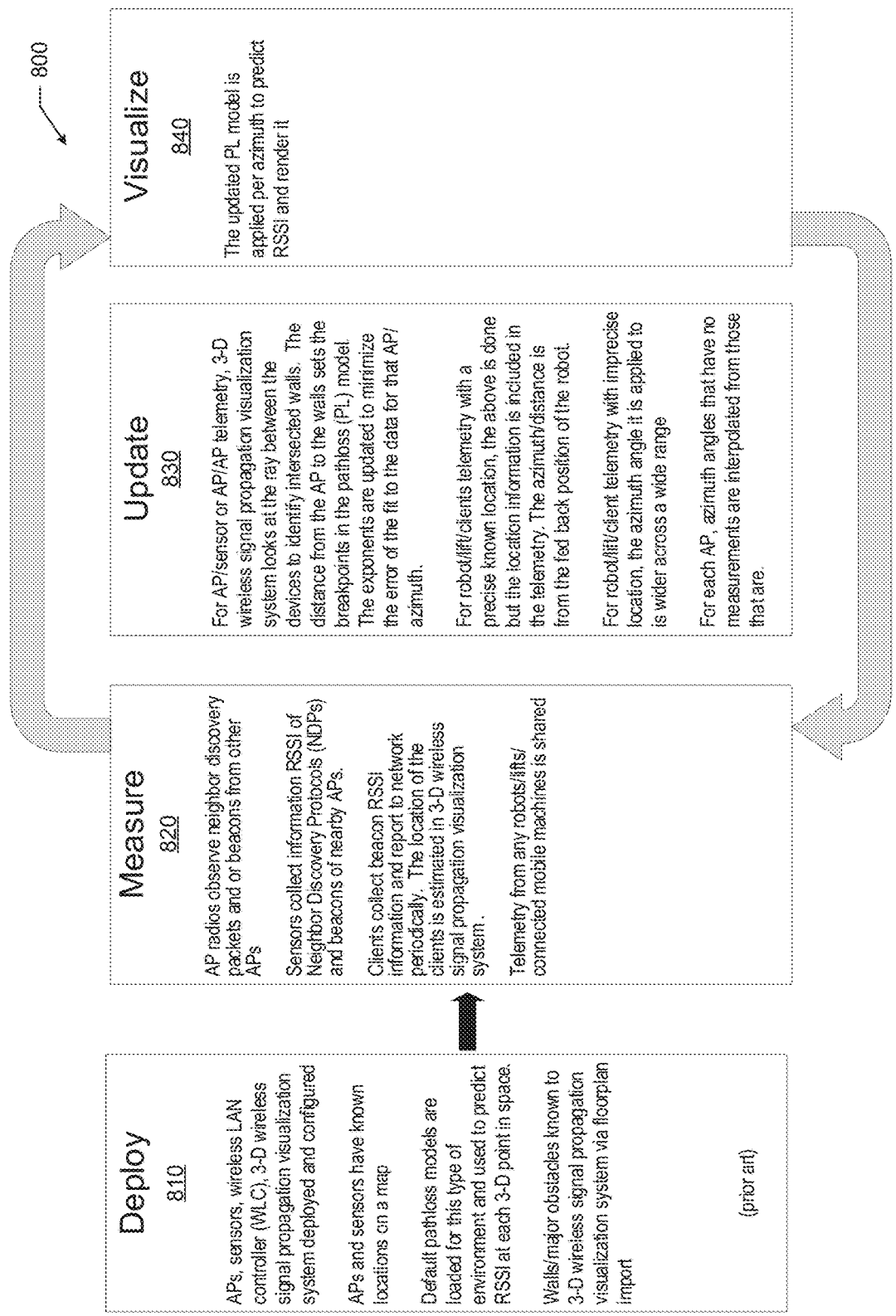
FIG. 8 is an example workflow for providing received signal strength indicators (RSSI) values for a 3-D visualization according to some aspects of the disclosed technology.

FIG. 8 is an example workflow 800 for providing received signal strength indicators (RSSIs) with telemetry feedback according to some aspects of the disclosed technology. In particular, the workflow 800 provides accurate RSSI prediction that changes dynamically as conditions in the network change by leveraging telemetry feedback, for example, based on the distance or azimuth angle between APs or AP/sensor.

According to some examples, the workflow 800 comprises various stages of deployment 810, measurement 820, update 830, and visualization 840. In some examples, according to the workflow 800, the wireless network 150 can transmit telemetry feedback to the network controller 170 as illustrated in FIG. 3. For example, APs 102 and sensors 103 can send telemetry data to the network controller 170 based on neighbor reports, 802.11k beacon reports, and sensor reports as shown in FIG. 3. Furthermore, per AP 102 at the azimuth angle where there are telemetry measurements, the path loss model can be updated based on the distance, azimuth angle, walls, or large obstructions on the map. The updated path loss model then can be used to visualize the predicted RSSIs at all 3-D locations. Details of each stage are described below and in FIG. 8.

In the deployment stage 810, APs, sensors, wireless LAN controller (WLC), and 3-D wireless signal propagation visualization system (e.g., 3-D signal propagation visualization system 100 as illustrated in FIG. 1) can be deployed and configured. Also, APs and sensors have known locations on a map of the space to be visualized. Default path loss models can be loaded and used to predict RSSI at each 3-D point in the space. Furthermore, information or data associated with any walls or obstacles can be imported to the 3-D wireless signal propagation visualization system (e.g., 3-D signal propagation visualization system 100 as illustrated in FIG. 1) via a floorplan or a building plan of the space.

In the measurement stage 820, AP radios can observe neighbor discovery packets and/or beacons from other APs. Moreover, sensors can collect information associated with RSSI of Neighbor Discovery Protocols (NDPs) and beacons of nearby or neighboring APs. Also, in the measurement stage 820, clients (e.g., client devices 105 as illustrated in FIG. 3) can collect beacon RSSI information and report to the network periodically. The location of the clients (e.g., client devices 105 as illustrated in FIG. 3) can be estimated in 3-D wireless signal propagation visualization system (e.g., 3-D signal propagation visualization system 100 as illustrated in FIG. 1).

In the update stage 830, for a pair of APs or AP/sensor telemetry, the 3-D wireless signal propagation visualization system (e.g., 3-D signal propagation visualization system 100 as illustrated in FIG. 1) can look at the ray between the devices to identify intersected walls. In some examples, the distance from the AP to the walls can set the breakpoints in the path loss (PL) model. In some instances, the exponents can be updated to minimize the error of the fit to the data for the azimuth angle. For each AP, azimuth angles that do not have measurements can be interpolated from those that have measurements.

In the visualization stage 840, the updated path loss model can be applied per azimuth angle to predict RSSI and render the 3-D visualization.

According to some examples, the method 600 includes presenting a 3-D visualization of a wireless signal propagation pattern representing the wireless signal strength from each of the plurality of APs in the 3-D space and the interference from the neighboring AP at step 640. For example, the visualization service 108 illustrated in FIG. 1 may present a 3-D visualization of a wireless signal propagation pattern representing the wireless signal strength from each of the plurality of APs in the 3-D space and the interference from the neighboring AP or attenuation caused by the neighboring APs. In some examples, the wireless signal propagation pattern includes partitioning of the 3-D space into one or more segments based on a degree of the wireless signal strength and the interference from the neighboring AP.

Figure 9:
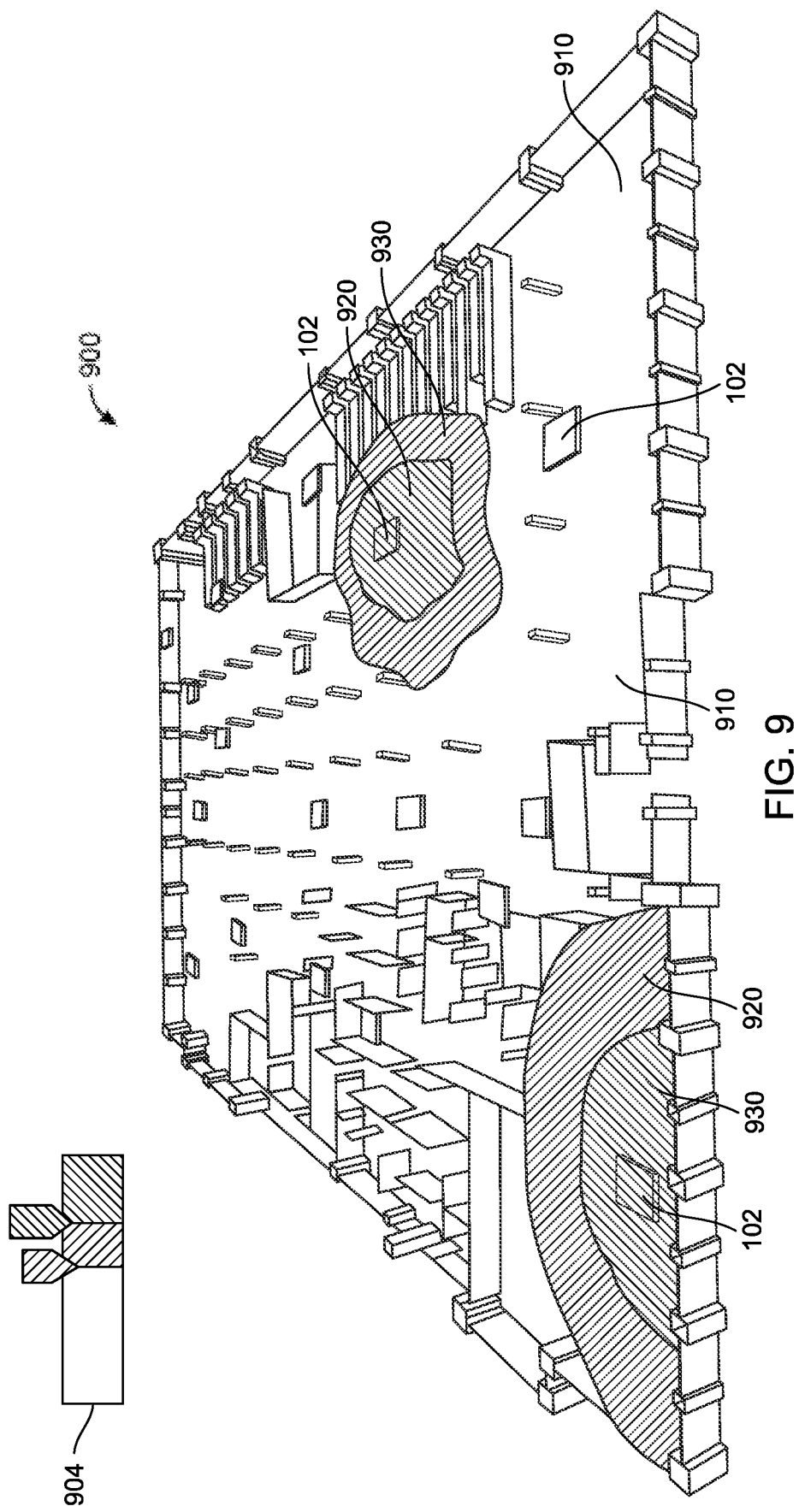
FIG. 9 illustrates an example 3-D visualization of wireless signal propagation patterns according to some aspects of the disclosed technology.

FIG. 9 illustrates an example 3-D visualization 900 of wireless signal propagation patterns where the wireless signal propagation pattern includes partitioning of the 3-D space into one or more segments 910-930 based on a degree of the wireless signal strength for APs 102 according to some aspects of the disclosed technology.

In some instances, the 3-D visualization 900 of wireless signal propagation patterns can include user interface 904 configured to allow a user to adjust a threshold to simulate the change of the wireless signal propagation based on varying thresholds.

According to some examples, the method 600 includes partitioning the 3-D space into one or more zones based on wireless signal propagation patterns and taking into account the wireless signal strength of APs, attenuation, and/or interferences caused by neighboring APs. For example, the visualization service 108 illustrated in FIG. 1 may partition the 3-D space into one or more zones based on wireless signal propagation patterns and taking into account the wireless signal strengths of APs, attenuation, and/or interferences. Such partitioning can help with site surveys where an area with poor wireless signal propagation or high radio frequency density can be identified for inspection. In some examples, the partitioning of the 3-D space into one or more zones can be based on a number of APs or a number of client devices per each of the one or more zones.

In some instances, the 3-D visualization of wireless signal propagation patterns including the partitioning of the 3-D space into one or more zones can provide statistical information of each of the one or more zones so that personnel can focus on certain zones where more inspection is desired based on the statistical information. In some examples, the statistical information can include data associated with APs or client devices connected to APs within the one or analysis of network configuration or network performance.

In some examples, the method 600 comprises marking a portion of the one or more segments if the wireless signal propagation pattern at the portion is smaller than a threshold. For example, the visualization service 108 illustrated in FIG. 1 may mark a portion of the one or more segments if the wireless signal propagation pattern at the portion is smaller than a threshold. As shown in FIG. 9, the 3-D visualization 900 of wireless signal propagation patterns can include markings, for example, in a different pattern or a color, to identify areas 930 that have poor wireless signal propagation.

In some instances, the method 600 comprises providing one or more suggestions to improve the wireless signal strength, for example, in areas where the wireless signal propagation pattern is smaller than a threshold. For example, the optimization service 118 or troubleshooting service 118 as illustrated in FIG. 1 can provide one or more suggestions to improve the wireless signal strength in areas where the wireless signal propagation pattern is smaller than a threshold. In some examples, the one or more suggestions include modifying a configuration of APs 102, modifying deployment of APs 102, or upgrade or change of APs 102.

In some examples, the method 600 comprises modifying a configuration of one or more AP s within the portion of which the wireless signal propagation pattern is smaller than the threshold. For example, the visualization service 108 illustrated in FIG. 1 may modify a configuration of one or more APs within the portion of which the wireless signal propagation pattern is smaller than the threshold.

According to some examples, the method 600 comprises receiving data associated with client devices in the 3-D space. For example, the visualization service 108 illustrated in FIG. 1 may receive data associated with client devices in the 3-D space. In some examples, the data associated with the client devices includes at least one of a location of the client devices in the 3-D space, a number of the client devices in each of the one or more segments, received signal strength indicators (RSSIs) from the client devices, and a type of network services used by the client devices (e.g., VoIP calls, video, etc.).

Further, the method comprises updating the 3-D visualization of the wireless signal propagation pattern based on the data associated with the client devices in the 3-D space. For example, the visualization service 108 illustrated in FIG. 1 may update the 3-D visualization of the wireless signal propagation pattern based on the data associated with the client devices in the 3-D space.

Figure 10:
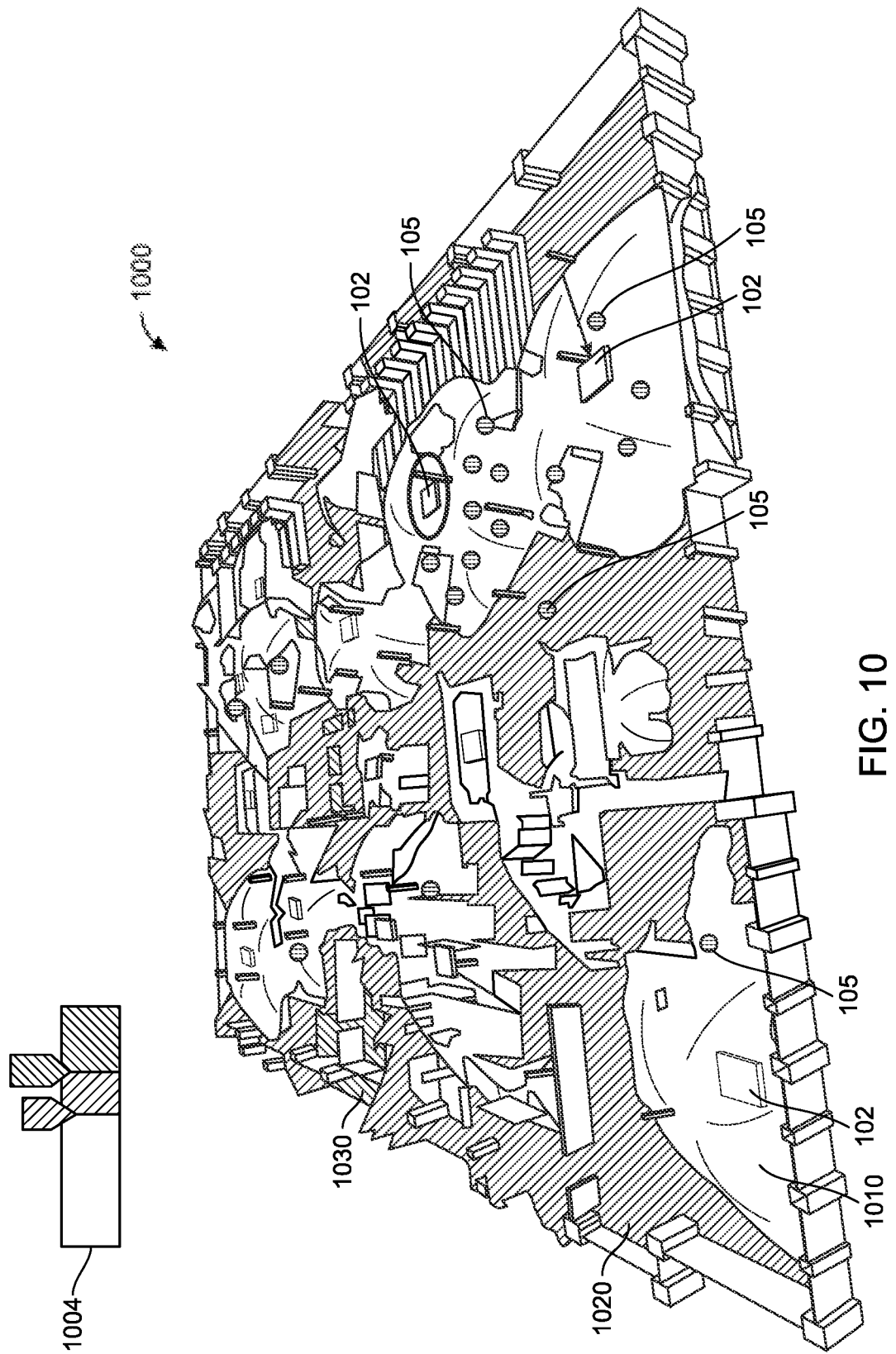
FIG. 10 illustrates an example 3-D visualization of wireless signal propagation including a location of client devices according to some aspects of the disclosed technology.

FIG. 10 illustrates an example 3-D visualization 1000 of wireless signal propagation for each of a plurality of APs 102 including a location of client devices 105 according to some aspects of the disclosed technology. In some examples, the 3-D visualization 1000 of wireless signal propagation can include visual identifiers of the location of client devices 105. For example, the visualization service 108 illustrated in FIG. 1 can include visual identifiers of the location of client devices 105 in the 3-D visualization of wireless signal propagation.

In some examples, the 3-D visualization 1000 of wireless signal propagation can further include a notification box (not shown) providing data associated with APs 102 or client devices 105, per AP, client device, segment, or zone, so that the network performance can be analyzed based on the data provided in the notification box.

In some examples, the 3-D visualization 1000 of wireless signal propagation can include user interface 1004 configured to allow a user to adjust a threshold to simulate the change of the wireless signal propagation based on varying thresholds. For example, the 3-D space can be divided into one or more zones 1010, 1020, and 1030 and represented in different colors, patterns, or other indicators depending on the thresholds.

Figure 11:
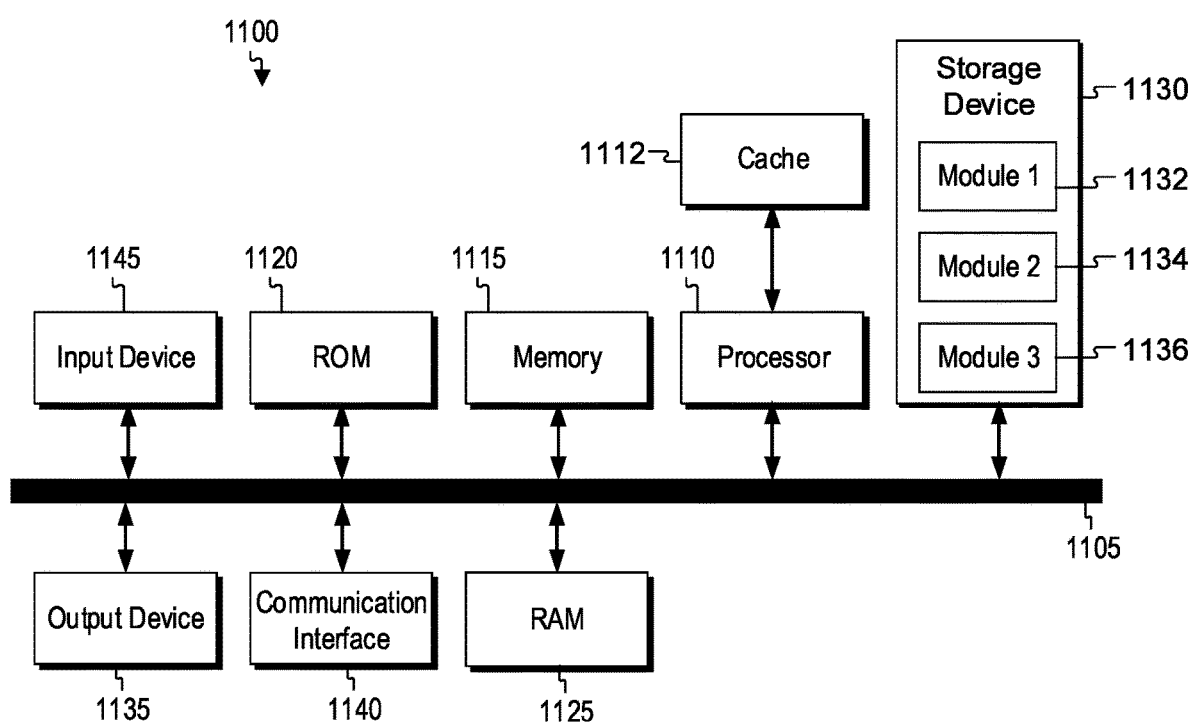
FIG. 11 shows an example computing system, which can be for example any computing device that can implement components of the system.

FIG. 11 shows an example of computing system 1100, which can be for example any computing device making up 3-D signal propagation visualization system 100, or any component thereof in which the components of the system are in communication with each other using connection 1105. Connection 1105 can be a physical connection via a bus, or a direct connection into processor 1110, such as in a chipset architecture. Connection 1105 can also be a virtual connection, networked connection, or logical connection.

In some embodiments computing system 1100 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read only memory (ROM) 1120 and random access memory (RAM) 1125 to processor 1110. Computing system 1100 can include a cache of high-speed memory 1112 connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140, which can generally govern and manage the user input and system output. There is no restriction on operating on any particular hardware arrangement and therefore the basic features here may easily be substituted for improved hardware or firmware arrangements as they are developed.

Storage device 1130 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1: A method comprising: identifying a plurality of access points in a 3-D space; determining a wireless signal strength for each of the plurality of access points; determining an interference with the wireless signal strength of each of the plurality of access points, wherein the interference is caused by a neighboring access point of the plurality of access points in the 3-D space; and presenting a 3-D visualization of a wireless signal propagation pattern representing the wireless signal strength from each of the plurality of access points in the 3-D space and the interference from the neighboring access point, wherein the wireless signal propagation pattern includes partitioning of the 3-D space into one or more segments based on a degree of the wireless signal strength and the interference from the neighboring access point.

Aspect 2: The method of Aspect 1, wherein the determining the wireless signal strength for each of the plurality of access points includes: projecting a plurality of ray-paths in a plurality of directions in the 3-D space, wherein the ray-paths originate from each of the plurality of access points and emanate in a variety of X, Y, and Z planes; determining whether the ray-paths interface with one or more materials defined in a building plan; for each ray-path of the ray-paths that interface with the one or more materials defined in the building plan, segmenting the respective ray-path into contiguous segments of substantially uniform mediums; and determining the wireless signal strength at points along the contiguous segments of the ray-paths, wherein the wireless signal strength degrades along the contiguous segments of the ray-paths as defined by a wireless signal propagation model as a function of distance through the contiguous segments and characteristics of the wireless signal strength through the substantially uniform mediums through which the contiguous segments traverse.

Aspect 3: The method of any of Aspects 1 to 2, wherein the determining of the interference from the neighboring access point includes: determining a distance and an angle between a first access point and a second access point of the plurality of access points, wherein the first access point is the neighboring access point of the second access point; and determining a signal strength within an area defined by the distance and the angle between the first access point and the second access point.

Aspect 4: The method of any of Aspects 1 to 3, further comprising: marking a portion of the one or more segments if the wireless signal propagation pattern at the portion is smaller than a threshold.

Aspect 5: The method of any of Aspects 1 to 4, further comprising: modifying a configuration of one or more access points within the portion of which the wireless signal propagation pattern is smaller than the threshold.

Aspect 6: The method of any of Aspects 1 to 5, further comprising: receiving data associated with client devices in the 3-D space; and updating the 3-D visualization of the wireless signal propagation pattern based on the data associated with the client devices in the 3-D space.

Aspect 7: The method of any of Aspects 1 to 6, wherein the data associated with the client devices includes at least one of a location of the client devices in the 3-D space, a number of the client devices in each of the one or more segments, received signal strength indicators (RSSIs) from the client devices, and a type of network services used by the client devices.

Aspect 9: A system comprising: a storage configured to store instructions; and a processor configured to execute the instructions and cause the processor to: identify a plurality of access points in a 3-D space, determine a wireless signal strength for each of the plurality of access points, determine an interference with the wireless signal strength of each of the plurality of access points, wherein the interference is caused by a neighboring access point of the plurality of access points in the 3-D space, and present a 3-D visualization of a wireless signal propagation pattern representing the wireless signal strength from each of the plurality of access points in the 3-D space and the interference from the neighboring access point, wherein the wireless signal propagation pattern includes partitioning of the 3-D space into one or more segments based on a degree of the wireless signal strength and the interference from the neighboring access point.

Aspect 10: The system of Aspect 9, wherein the processor is configured to execute the instructions and cause the processor to: project a plurality of ray-paths in a plurality of directions in the 3-D space, wherein the ray-paths originate from each of the plurality of access points and emanate in a variety of X, Y, and Z planes; determine whether the ray-paths interface with one or more materials defined in a building plan; for each ray-path of the ray-paths that interface with the one or more materials defined in the building plan, segment the respective ray-path into contiguous segments of substantially uniform mediums; and determine the wireless signal strength at points along the contiguous segments of the ray-paths, wherein the wireless signal strength degrades along the contiguous segments of the ray-paths as defined by a wireless signal propagation model as a function of distance through the contiguous segments and characteristics of the wireless signal strength through the substantially uniform mediums through which the contiguous segments traverse.

Aspect 11: The system of any of Aspects 9 to 10, wherein the processor is configured to execute the instructions and cause the processor to: determine a distance and an angle between a first access point and a second access point of the plurality of access points, wherein the first access point is the neighboring access point of the second access point; and determine a signal strength within an area defined by the distance and the angle between the first access point and the second access point.

Aspect 12: The system of any of Aspects 9 to 11, wherein the processor is configured to execute the instructions and cause the processor to: mark a portion of the one or more segments if the wireless signal propagation pattern at the portion is smaller than a threshold.

Aspect 13: The system of any of Aspects 9 to 12, wherein the processor is configured to execute the instructions and cause the processor to: modify a configuration of one or more access points within the portion of which the wireless signal propagation pattern is smaller than the threshold.

Aspect 14: The system of any of Aspects 9 to 13, wherein the processor is configured to execute the instructions and cause the processor to: receive data associated with client devices in the 3-D space; and update the 3-D visualization of the wireless signal propagation pattern based on the data associated with the client devices in the 3-D space.

Aspect 15: The system of any of Aspects 9 to 14, wherein the data associated with the client devices includes at least one of a location of the client devices in the 3-D space, a number of the client devices in each of the one or more segments, received signal strength indicators (RSSIs) from the client devices, and a type of network services used by the client devices.

Aspect 17: A non-transitory computer readable medium comprising instructions, the instructions, when executed by a computing system, cause the computing system to: identify a plurality of access points in a 3-D space; determine a wireless signal strength for each of the plurality of access points; determine an interference with the wireless signal strength of each of the plurality of access points, wherein the interference is caused by a neighboring access point of the plurality of access points in the 3-D space; and present a 3-D visualization of a wireless signal propagation pattern representing the wireless signal strength from each of the plurality of access points in the 3-D space and the interference from the neighboring access point, wherein the wireless signal propagation pattern includes partitioning of the 3-D space into one or more segments based on a degree of the wireless signal strength and the interference from the neighboring access point.

Aspect 18: The computer readable medium of Aspect 17, wherein the computer readable medium further comprises instructions that, when executed by the computing system, cause the computing system to: project a plurality of ray-paths in a plurality of directions in the 3-D space, wherein the ray-paths originate from each of the plurality of access points and emanate in a variety of X, Y, and Z planes; determine whether the ray-paths interface with one or more materials defined in a building plan; for each ray-path of the ray-paths that interface with the one or more materials defined in the building plan, segment the respective ray-path into contiguous segments of substantially uniform mediums; and determine the wireless signal strength at points along the contiguous segments of the ray-paths, wherein the wireless signal strength degrades along the contiguous segments of the ray-paths as defined by a wireless signal propagation model as a function of distance through the contiguous segments and characteristics of the wireless signal strength through the substantially uniform mediums through which the contiguous segments traverse.

Aspect 19: The computer readable medium of any of Aspects 17 to 18, wherein the computer readable medium further comprises instructions that, when executed by the computing system, cause the computing system to: determine a distance and an angle between a first access point and a second access point of the plurality of access points, wherein the first access point is the neighboring access point of the second access point; and determine a signal strength within an area defined by the distance and the angle between the first access point and the second access point.

Aspect 20: The computer readable medium of any of Aspects 17 to 19, wherein the computer readable medium further comprises instructions that, when executed by the computing system, cause the computing system to: mark a portion of the one or more segments if the wireless signal propagation pattern at the portion is smaller than a threshold.

Aspect 21: The computer readable medium of any of Aspects 17 to 20, wherein the computer readable medium further comprises instructions that, when executed by the computing system, cause the computing system to: modify a configuration of one or more access points within the portion of which the wireless signal propagation pattern is smaller than the threshold.

Aspect 22: The computer readable medium of any of Aspects 17 to 21, wherein the computer readable medium further comprises instructions that, when executed by the computing system, cause the computing system to: receive data associated with client devices in the 3-D space; and update the 3-D visualization of the wireless signal propagation pattern based on the data associated with the client devices in the 3-D space.

Aspect 23: The computer readable medium of any of Aspects 17 to 22, the data associated with the client devices includes at least one of a location of the client devices in the 3-D space, a number of the client devices in each of the one or more segments, received signal strength indicators (RSSIs) from the client devices, and a type of network services used by the client devices.

What is claimed is:

1. A method comprising:
projecting a plurality of ray-paths in a plurality of directions within a building;
determining whether one or more of the plurality of ray-paths interface with one or more objects within the building;
segmenting each ray-path of the plurality of ray-paths that interface with the one or more objects into contiguous segments of substantially uniform mediums;
determining a radio frequency (RF) signal strength at one or more points along the segments, wherein the RF signal strength at a first point along a first segment varies from the RF signal strength at a second point along the first segment based at least in part on the substantially uniform mediums the segment is projected; and calculating an RF propagation pattern based at least on the RF signal strength.

2. The method of claim 1, wherein the plurality of ray-paths originate from one or more Wi-Fi access points.

3. The method of claim 1, wherein the plurality of directions include X, Y and Z planes.

4. The method of claim 1, wherein the one or more objects include building material.

5. The method of claim 4, wherein the building material is defined by a building plan.

6. The method of claim 1, further comprising:
rendering a 3-D visualization of the RF propagation pattern.

7. The method of claim 1, wherein the substantially uniform mediums include at least one of open space, concrete, glass, wood, metal, non-metal, glass, or liquid.

8. The method of claim 1, wherein the RF signal degrades along the plurality of ray-paths.

9. A system comprising:
at least one processor; and
a memory storing instructions, which when executed by the at least one processor causes the system to:
project a plurality of ray-paths in a plurality of directions within a building;
determine whether one or more of the plurality of ray-paths interface with one or more objects within the building;
segment each ray-path of the plurality of ray-paths that interface with the one or more objects into contiguous segments of substantially uniform mediums;
determine a radio frequency (RF) signal strength at one or more points along the segments, wherein the RF signal strength at a first point along a first segment varies from the RF signal strength at a second point along the first segment based at least in part on the substantially uniform mediums the segment is projected; and
calculate an RF propagation pattern based at least on the RF signal strength.

10. The system of claim 9, wherein the plurality of ray-paths originate from one or more Wi-Fi access points.

11. The system of claim 9, wherein the plurality of directions include X, Y and Z planes.

12. The system of claim 9, wherein the one or more objects include building material.

13. The system of claim 12, wherein the building material is defined by a building plan.

14. The system of claim 9, further comprising instructions when executed cause the system to:
render a 3-D visualization of the RF propagation pattern.

15. The system of claim 9, wherein the substantially uniform mediums include at least one of open space, concrete, glass, wood, metal, non-metal, glass, or liquid.

16. The system of claim 9, wherein the RF signal degrades along the plurality of ray-paths.

17. A non-transitory computer readable medium storing instructions, which when executed by at least one processor causes the at least one processor to:
project a plurality of ray-paths in a plurality of directions within a building;
determine whether one or more of the plurality of ray-paths interface with one or more objects within the building;
segment each ray-path of the plurality of ray-paths that interface with the one or more objects into contiguous segments of substantially uniform mediums;
determine a radio frequency (RF) signal strength at one or more points along the segments, wherein the RF signal strength at a first point along a first segment varies from the RF signal strength at a second point along the first segment based at least in part on the substantially uniform mediums the segment is projected; and
calculate an RF propagation pattern based at least on the RF signal strength.

18. The non-transitory computer readable medium of claim 17, wherein the one or more objects include building material.

19. The non-transitory computer readable medium of claim 18, wherein the building material is defined by a building plan.

20. The non-transitory computer readable medium of claim 17, further comprising instructions which when executed cause the at least one processor to: render a 3-D visualization of the RF propagation pattern.

* * * * *